United States Patent
Rodriguez et al.

(10) Patent No.: US 6,801,846 B1
(45) Date of Patent: Oct. 5, 2004

(54) EXHAUST GAS CONTROL IN AN ENGINE HAVING A TWO-STAGE TURBOCHARGER

(75) Inventors: Rogelio Rodriguez, Plainfield, IL (US); Elias P. Soupos, Chicago, IL (US); Priyankar S. Balekai, Oak Park, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/692,948

(22) Filed: Oct. 24, 2003

(51) Int. Cl.⁷ ............................................. F02D 23/00
(52) U.S. Cl. ............................................ 701/102; 60/612
(58) Field of Search .................................. 701/102, 101, 701/115; 60/612, 600, 601, 602, 603; 123/564

(56) References Cited

U.S. PATENT DOCUMENTS 5,960,631 A * 10/1999 Hayashi ........................ 60/602
6,425,246 B1 * 7/2002 Schmid ........................ 60/602
6,510,691 B1 * 1/2003 Schmid ........................ 60/602

FOREIGN PATENT DOCUMENTS

DE 198 04 466 A1 * 8/1999 ........... F02B/37/12

* cited by examiner

Primary Examiner—Hieu T. Vo
(74) Attorney, Agent, or Firm—Dennis Kelly Sullivan; Susan L. Lukasik; Jeffrey P. Calfa

(57) ABSTRACT

A control system (58) for controlling the extent to which a valve (50) selectively by-passes exhaust flow around one of two turbines (18T, 20T) in an engine exhaust system (14). A desired set-point (TCBC_DES) and the actual set-point of operation of the valve are used to develop a set-point error for closed-loop control of the actual set-point. A data value for closed-loop gain is selected from a schedule (164, 166) based on engine speed and fueling. The selected data value of closed-loop gain and the set-point error data value are used to create a data value for a closed-loop output (TCBC_DTY_PIF) that is used to create a data value for a final output for forcing the actual set-point to the desired set-point.

24 Claims, 4 Drawing Sheets

US 6,801,846 B1

EXHAUST GAS CONTROL IN AN ENGINE HAVING A TWO-STAGE TURBOCHARGER

FIELD OF THE INVENTION

This invention relates to internal combustion engines having combustion chambers within which fuel is combusted and exhaust systems through which products of combustion pass before entering the atmosphere. More specifically, the invention relates to engines, systems, and methods for control of exhaust flow in an engine exhaust system that contains high-pressure and low-pressure turbines of a two-stage turbocharger and an exhaust valve for selectively diverting the flow around one of the turbines.

BACKGROUND OF THE INVENTION

A known electronic engine control system comprises a processor-based engine controller that processes data from various sources to develop control data for controlling certain functions of the engine. One function that is controlled in certain engines is exhaust back-pressure. The control system processes certain data useful in setting desired exhaust back-pressure, and then uses the result of that processing to set the extent to which an exhaust back-pressure control valve is open.

Certain diesel engines that power motor vehicles have turbochargers that are effective to improve certain aspects of engine operation and performance. One such turbocharger is a two-stage turbocharger that comprises high- and low-pressure turbines in series flow relationship in the exhaust system and an exhaust by-pass valve that is in parallel flow relationship to the high-pressure turbine and under the control of the engine control system. The engine control system processes various data to control the extent to which the exhaust by-pass valve shunts flow around the high-pressure turbine such that exhaust back-pressure and engine boost are regulated in a manner that achieves desired engine operation. Certain changes in input parameters affecting engine operation make it appropriate to change the extent to which the by-pass valve shunts exhaust gas flow around the high-pressure turbine to the low-pressure turbine.

SUMMARY OF THE INVENTION

Briefly, the present invention relates to improvements in control of exhaust gas flow in a turbocharged engine of the type described above.

General principles of the invention contemplate the use of various parameters such engine temperature and engine speed for control of the by-pass valve. More specific principles relate to specific implementations of fuel- and speed-scheduled gain strategies for closed-loop control of the by-pass valve.

Accordingly a generic aspect of the invention relates to an internal combustion engine comprising combustion chambers within which fuel is combusted and an exhaust system through which exhaust flow containing products of combustion is conveyed from the engine. The exhaust system contains first and second turbines of a multi-stage turbocharger and a valve for selectively by-passing the exhaust flow around one of the turbines. A control system comprising a processor for processing data develops data for controlling the extent to which the valve selectively by-passes the exhaust flow around the one turbine.

The processor comprises a control strategy a) for processing data values of various parameters to develop a data value representing a desired set-point of operation for the valve corresponding to a desired exhaust by-pass flow around the one turbine, b) for processing the desired set-point data value and a data value correlated with the actual set-point of operation of the valve to develop a set-point error data value for closed-loop control of the actual set-point, c) for selecting a data value of closed-loop gain from a schedule based on a data value of a parameter that characterizes an aspect of engine operation, d) for processing both the selected data value of closed-loop gain and the set-point error data value to create a data value for a closed-loop output, and e) for using the data value for the closed-loop output to create a data value for a final output for forcing the actual set-point to the desired set-point.

Another generic aspect relates to the system that has just been described.

Still another generic aspect relates to the method that is performed by the system just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
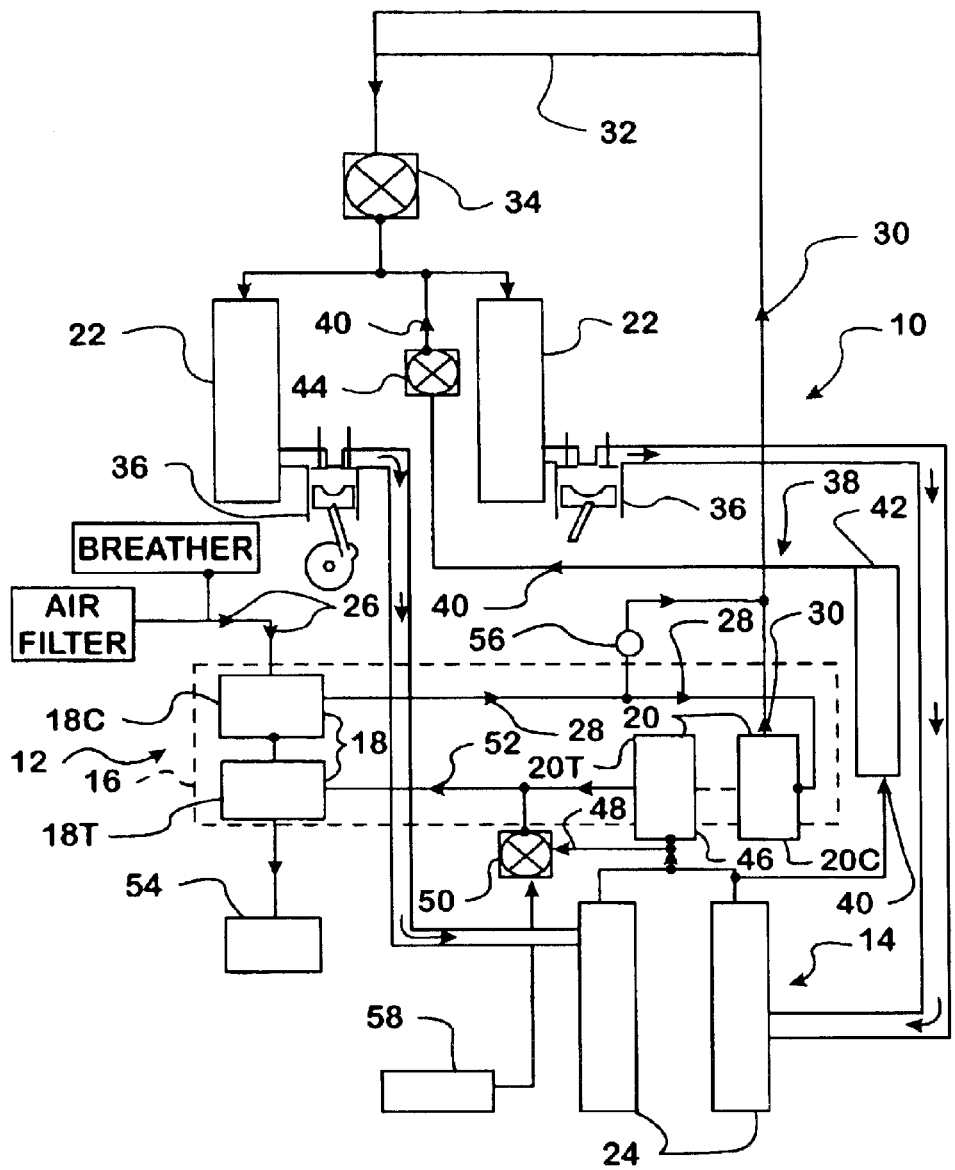
FIG. 1 is a general schematic diagram of an exemplary internal combustion engine having a two-stage turbocharger system with exhaust gas control in accordance with principles of the present invention.

FIG. 1 shows an exemplary internal combustion engine 10 having an intake system 12 through which air for combustion enters the engine and an exhaust system 14 through which exhaust gas resulting from combustion exits the engine. Engine 10 is, by way of example, a turbocharged diesel engine comprising a two-stage turbocharger 16 that has a low-pressure stage 18 and a high-pressure stage 20. By way of example, engine 10 is a multi-cylinder V-type engine having intake manifolds 22 and exhaust manifolds 24, and when used in a motor vehicle, such as a truck, is coupled through a drivetrain (not shown) to propel the vehicle.

Air drawn into intake system 12 follows an entrance path indicated by arrows 26 leading to a compressor 18C of low-pressure stage 18. A compressor 20C of high-pressure stage 20 is in downstream series flow relationship to compressor 18C via a path marked by arrows 28. A path marked by arrows 30 continues from compressor 20C through a charge air cooler 32 and an intake throttle valve 34 to intake manifolds 22.

From intake manifolds 22, charge air enters engine cylinders 36 into which fuel is injected to form a mixture that is combusted to power the engine. Gas resulting from combustion is exhausted through exhaust system 14, but some portion may be recirculated through an exhaust gas recirculation (EGR) system 38. Recirculated exhaust gas from exhaust manifolds 24 follows a path marked by arrows 40 through an EGR cooler 42 and an EGR valve 44 back to intake manifolds 22.

Upon leaving exhaust manifolds 24, exhaust gas that is not recirculated is constrained to take one or both of two parallel paths marked by respective arrows 46, 48. Path 46 comprises a turbine 20T of high-pressure stage 20, and path 48 an exhaust by-pass valve 50. After turbine 20T and valve 50, the paths 46, 48 merge into a common path 52 leading to a turbine 18T of low-pressure stage 18. Beyond turbine 18T, exhaust gas may pass through one or more exhaust gas treatment devices, such as a catalyst 54, before being exhausted to atmosphere.

A by-pass valve 56, such as a check valve, is placed in parallel relationship to high-pressure compressor 20C to enable charge air from low-pressure compressor 18C to by-pass the former compressor under certain conditions. Valve 56 will be forced closed whenever the pressure of charge air being developed by high-pressure compressor 20C is equal to or greater than the pressure of charge air being developed by low-pressure compressor 18C, but will open whenever the pressure of charge air being developed by low-pressure compressor 18C exceeds the pressure of charge air being developed by high-pressure compressor 20C.

Exhaust by-pass valve 50 is under the control of an engine control system 58 that processes various data to control the extent to which valve 50 shunts flow around high-pressure turbine 20T. Certain changes in input parameters affecting engine operation make it appropriate to change the extent to which valve 50 shunts exhaust gas flow around turbine 20T to low-pressure turbine 18T. Control of valve 50 is effective to regulate exhaust back-pressure and engine boost in a manner that achieves desired engine operation while affording the opportunity for more efficient sizing in the design of both stages 18 and 20.

The presence of valve 56 in effect de-couples compressor 20C whenever it becomes too restrictive for high-end engine operation. Valve 56 opens automatically whenever the outlet pressure being developed by low-pressure compressor 18C exceeds the outlet pressure being developed by high-pressure compressor 20C and closes whenever the outlet pressure being developed by high-pressure compressor 20C is equal to or less than that being developed by low-pressure compressor 18C, preventing reverse flow in the process.

By closing exhaust by-pass valve 50 during low-end engine operation so that the entire exhaust gas flow passes through both turbines 20T, 18T, compressor 20C will develop higher outlet pressure that forces valve 56 closed so that the charge air is developed by both compressors. This can provide desirable increased low-end boost. By maximally opening exhaust by-pass valve 50 during high-end engine operation so that substantially all the exhaust gas flow by-passes turbine 20T, compressor 20C will not develop higher outlet pressure than compressor 18C, and that condition will cause valve 56 to open so that substantially all charge air flow from the latter compressor will by-pass compressor 20C and avoid the restriction that would otherwise be imposed by the charge air flow having to pass through compressor 20C, which it should be remembered has a smaller size and hence presents greater restriction to flow.

Over a mid-speed range of engine operation, valve 50 is may be operated to partially open conditions as appropriate to achieve desired boost and back-pressure. It is believed that low-end performance improvements may facilitate achievement of improvements in light duty cycle exhaust emissions and engine transient response while allowing the size of the high-pressure stage to be made smaller without compromising high-end performance.

Figure 2:
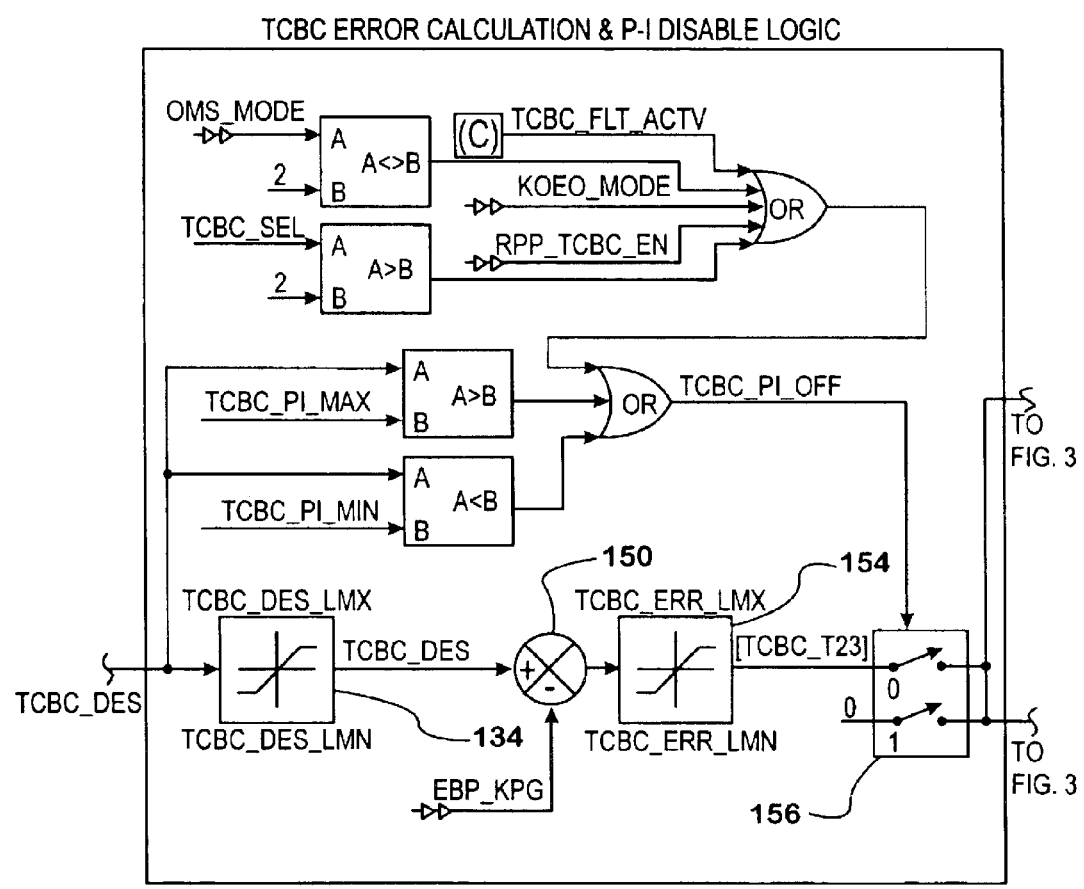
FIG. 2 is a first portion of a schematic software strategy diagram of an exemplary embodiment of control strategy according to the present invention.
Figure 3:
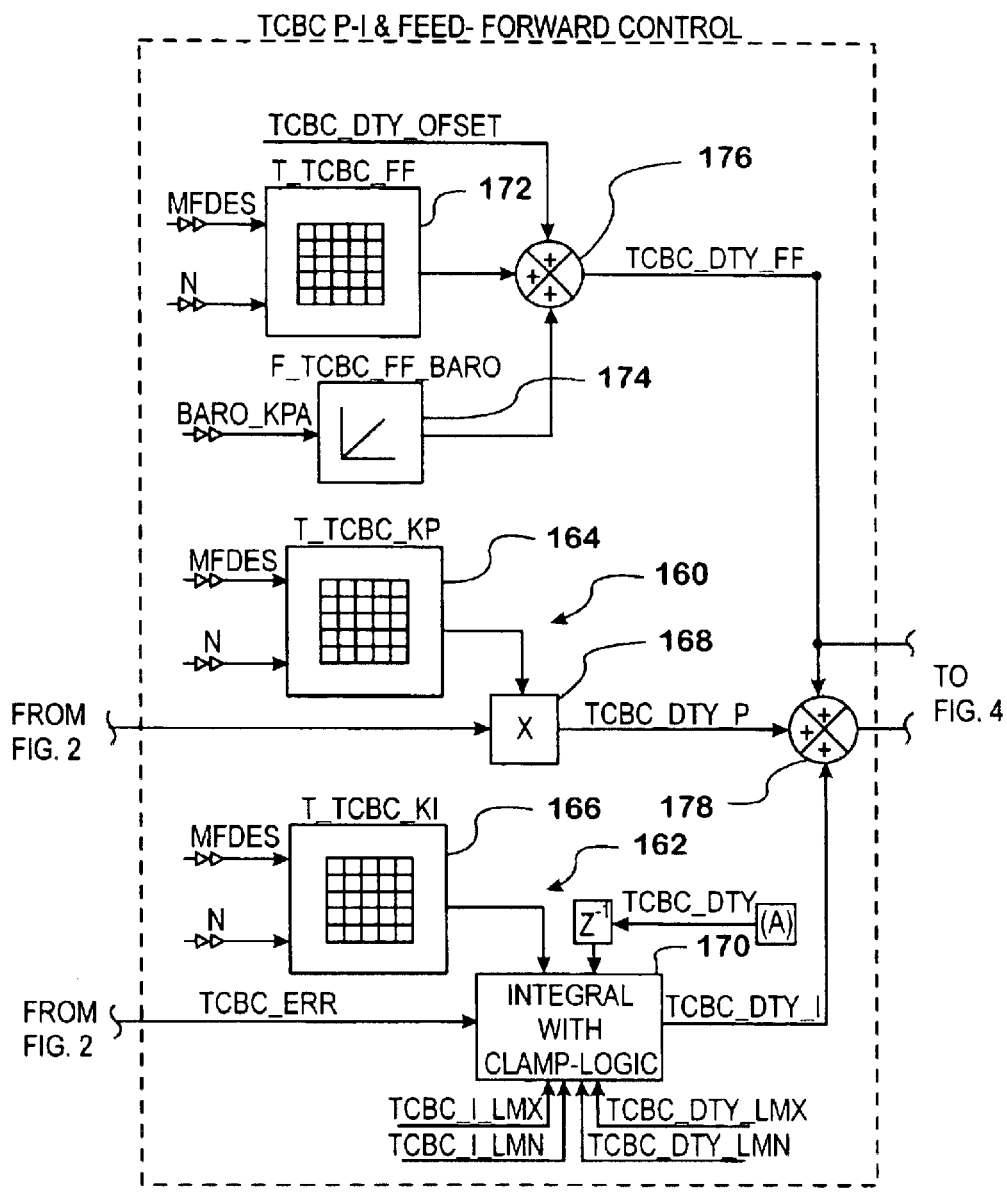
FIG. 3 is a second portion of the software strategy diagram.
Figure 4:
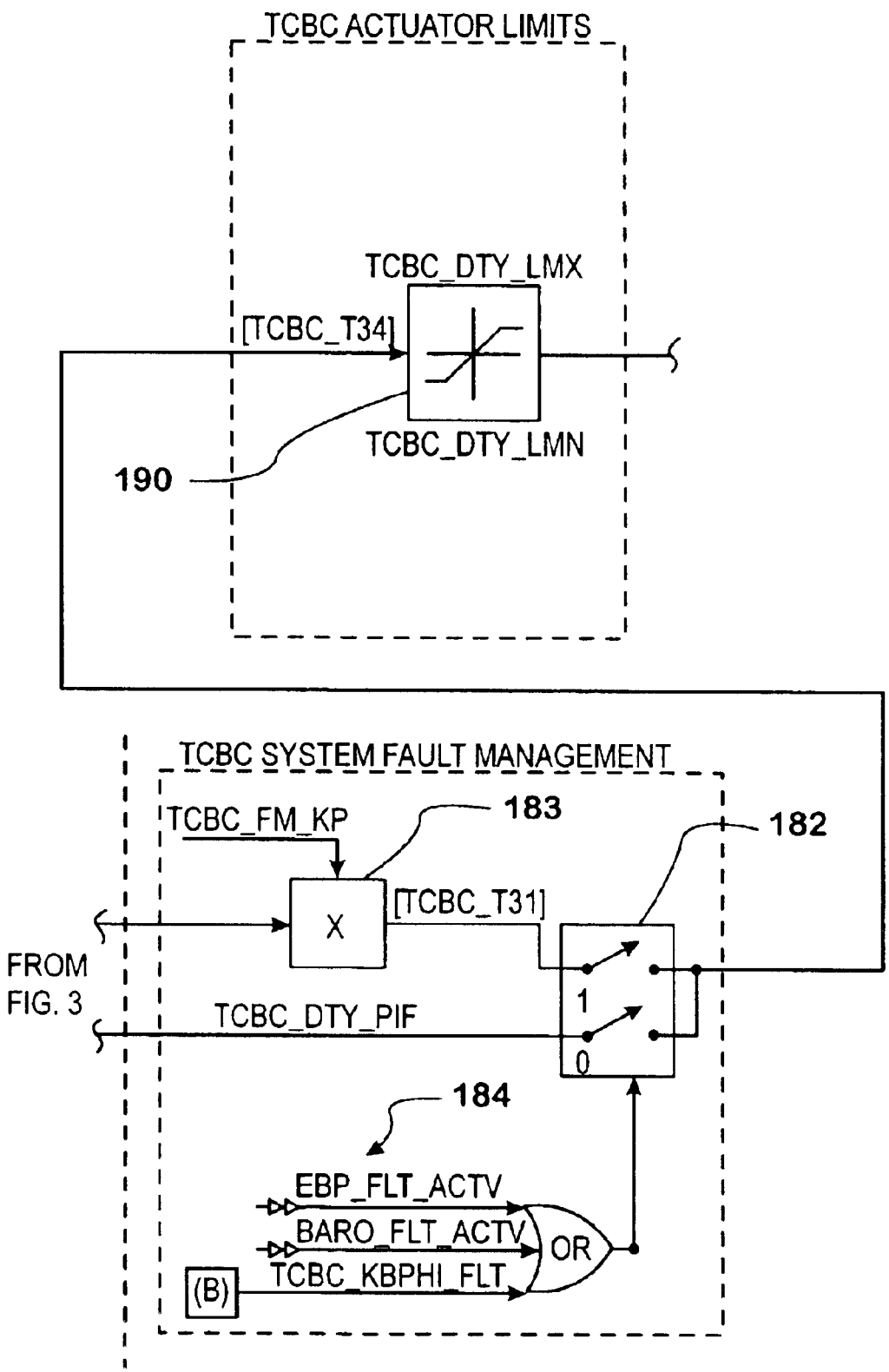
FIG. 4 is a third portion of the software strategy diagram.

FIGS. 2–4 illustrate the inventive turbocharger by-pass control (TCBC) strategy embodied in engine control system 58 for setting the extent to which by-pass valve 50 is open. Control system 58 comprises one or more processors containing algorithms for processing data.

A desired commanded turbocharger by-pass control value (parameter TCBC_DES) is developed by control system 58 in any suitably appropriate way for the particular engine. Because engine temperature, barometric pressure, engine speed, and engine fueling can influence the value, the processing of engine temperature data, barometric pressure data, engine speed data, and desired engine fueling data according to any suitably appropriate algorithm or algorithms is one way of developing TCBC_DES. Compensation and filtering for certain transient conditions, and limiting of various data may be included as appropriate.

The data value for TCBC_DES represents a parameter that is evaluated by an evaluation function 134 for compliance with minimum and maximum limits (parameters TCBC_DES_LMN and TCBC_DES_LMX. If the data value is within the limits, it is passed by function 134. If it is above the maximum, the value passed is the value of TCBC_DES_LMX. If it is below the minimum, the value passed is the value of TCBC_DES_LMN.

The data value passed by function 134 TCBC_DES forms an input for closed-loop control of TCBC. A summing function 150 in FIG. 2 is where the loop is closed. That function subtracts a data value EBP_KPG representing actual exhaust back-pressure as measured by any suitable means such as a pressure sensor, from the data value for TCBC_DES to create a data value representing the error difference between them.

That error difference is evaluated by an evaluation function 154 against minimum and maximum preset limits, as shown by FIG. 2. If the data value for the error difference is more positive than the data value for the maximum preset limit (parameter TCBC_ERR_LMX), then the data value for TCBC_ERR_LMX is passed. If the data value for the error difference is more negative than the data value for the minimum preset limit (parameter TCBC_ERR_LMN), then the data value for TCBC_ERR_LMN is passed. If the data value for the error difference is between the limits, the data value for the actual error difference itself is passed. Whatever its value, the passed data value is represented by the parameter TCBC_T21 in FIG. 2.

When closed-loop control of valve 50 is active, a switch function 156 passes the data value for TCBC_T21 as the data value for a parameter TCBC_ERR, which is then processed by TCBC P-I & Feed-Forward Control, shown in FIG. 3. When closed-loop control of valve 50 is inactive, switch function 156 is turned off to discontinue passing the data value of TCBC_ERR. The switch function may be turned off under various circumstances such as during engine cranking, engine diagnostic testing, and calibration development.

With closed-loop control of TCBC active, error data represented by the data value for TCBC_ERR is processed by both a proportional function 160 and an integral function 162, as shown in FIG. 3. A respective gain is associated with each function 160, 162, the gain KP being associated with proportional function 160 and the gain KI being associated with integral function 162. In accordance with certain principles of the invention, each gain is itself a function of engine fueling and engine speed.

FIG. 3 shows TCBC P-I & Feed-Forward Control to comprise a map 164 for setting the gain for proportional function 160 and a map 166 for setting the gain for integral function 164.

Map 164 contains a number of data values of proportional gain KP, each of which correlates with a respective pair of data values, one for desired engine fueling MFDES and one for engine speed N. Each data value for desired engine fueling MFDES represents a corresponding fractional span of a range of engine fueling while each data value for engine speed represents a corresponding fractional span of a range of engine speeds. For any given combination of desired engine fueling and engine speed, desired engine fueling will fall within one of its fractional spans in map 164, and engine speed within one of its fractional spans, causing the particular data value for proportional gain KP corresponding to the two respective fractional spans to be supplied to a multiplication function 168.

Map 166 contains a number of data values of integral gain KI, each of which correlates with a respective pair of data values, one for desired engine fueling MFDES and one for engine speed N. Each data value for desired engine fueling MFDES represents a corresponding fractional span of a range of engine fueling while each data value for engine speed represents a corresponding fractional span of a range of engine speeds. For any given combination of desired engine fueling, desired engine fueling will fall within one of its fractional spans in map 166, and engine speed within one of its fractional spans, causing the particular data value for integral gain corresponding to the two respective fractional spans to be supplied to an integrator 170 of integral function 162. Integrator 170 includes clamp-logic for constraining the integration rate to maximum and minimum limits.

An approximate target value for TCBC set-point is provided by a feed-forward component using a map 172 that contains a number of data values representing set-point target values. Each set-point target data value correlates with a respective pair of data values, one for engine speed N and one for desired engine fueling MFDES. Each data value for engine speed represents a corresponding fractional span of the total engine speed range while each data value for desired fueling represents a corresponding fractional span of the total range of engine fueling. For any given combination of engine speed and desired fueling, engine speed will fall within one of the fractional speed spans in each map, and desired fueling within one of the fractional fueling spans, causing the particular set-point target value corresponding to the two respective fractional spans to be selected for further processing.

It should be noticed that the feed-forward target set-point selection using speed and desired fueling is an open-loop function, whereas the proportional and integral control provided by functions 160, 162 are closed-loop functions. The strategy therefore relies on an open-loop, feed-forward function to approximate the desired TCBC set-point and a closed-loop function acting in concert with the open-loop function to actually attain the desired set-point.

Rather than relying on speed and desired fueling exclusively for the open-loop approximation of TCBC set-point, the disclosed strategy also includes barometric pressure BARO_KPA and an offset as additional factors. A function generator 174 and an offset (parameter TCBC_DTY_OFSET) provide two additional data values that are summed by a summing function 176 with the data value obtained from map 172 to create a data value for a parameter TCBC_DTY_FF representing a target data value that at least approximates desired TCBC.

The data value for TCBC_DTY_FF, the data value for TCBC_DTY_P provided by proportional function 160, and the data value for TCBC_DTY_I provided by integral function 162 are algebraically summed by a summing function 178. The data value resulting from the summation is the data value for a parameter TCBC_DTY_PIF (see FIG. 4) that is supplied to a switch function 182 that is part of fault management.

Switch function 182 selects either the data value for TCBC_DTY_PIF or the data value for TCBC_T31 for further processing, depending on occurrence or non-occurrence of a fault that could possibly affect TCBC. The data value for TCBC_T31 is obtained by the processing of the data value for TCBC_DTY_FF by a multiplication function 183 where a multiplier TCBC_FM_KP is applied. While the control system possesses various fault detection capabilities, specific details are not included here. Suffice it to say that the detection of a fault that could possibly affect TCBC operates switch function 182 via one or more control inputs, 184 generally, to cause TCBC to be open-loop controlled solely by the data value for TCBC_T31. Absence of a fault causes switch function 182 to pass the data value for TCBC_DTY_PIF instead, thereby providing closed-loop control of TCBC.

Whatever data value is passed by switch function 182 is passed for evaluation with respect to TCBC Actuator Limits that define limits of a range of valid values for operating an actuator of valve 50. An evaluation function 190 sets data values for minimum and maximum limits (parameters TCBC_DTY_LMX and TCBC_DTY_LMN). So long as the data value passed by switch function 182 is between those limits, that value is used for setting the extent to which by-pass valve 50 opens.

In summary then, the disclosed strategy has been shown to develop desired TCBC as an input to a control system for forcing actual TCBC to correspond as closely as possible to that input. Various forms of compensation can be applied to the desired TCBC input ahead of the point where the feedback loop is closed. While generic principles of the invention are broad enough to encompass any, all, or none of those various forms of compensation, those various forms of compensation constitute more specific principles of the invention within the generic principles. The strategy may be executed at any appropriate execution rate, such as 125 hz for example.

The combination of proportional control and integral control, i.e. P-I control, is considered a preferred form of feedback control that is most appropriate for control of TCBC. The conjunction of feed-forward, open-loop control and the preferred form of closed-loop are also preferred. Generic principles of the invention may however be practiced in other than the disclosed preferred form.

While a presently preferred embodiment of the invention has been illustrated and described, it should be appreciated that principles of the invention apply to all embodiments falling within the scope of the following claims.

What is claimed is:

1. An internal combustion engine comprising:
   combustion chambers within which fuel is combusted;
   an exhaust system through which exhaust flow containing products of combustion is conveyed from the engine, including first and second turbines of a multi-stage turbocharger and a valve for selectively by-passing the exhaust flow around one of the turbines; and
   a control system comprising a processor for processing data to develop data for controlling the extent to which the valve selectively by-passes the exhaust flow around the one turbine, wherein the processor comprises a control strategy a) for processing data values of various parameters to develop a data value representing a desired set-point of operation for the valve corresponding to a desired exhaust by-pass flow around the one turbine, b) for processing the desired set-point data value and a data value correlated with the actual set-point of operation of the valve to develop a set-point error data value for closed-loop control of the actual set-point, c) for selecting a data value of closed-loop gain from a schedule based on a data value of a parameter that characterizes an aspect of engine operation, d) for processing both the selected data value of closed-loop gain and the set-point error data value to create a data value for a closed-loop output, and e) for using the data value for the closed-loop output to create a data value for a final output for forcing the actual set-point to the desired set-point.

2. An engine as set forth in claim 1 wherein the processor comprises strategy for processing the set-point error data value through both a proportional function and an integral function using a respective data value of closed-loop gain from a schedule for each of the proportional and integral functions and for using respective data values resulting from processing of the set-point error data value by the respective proportional and integral functions to create the data value for the closed-loop output.

3. An engine as set forth in claim 2 wherein the processor comprises strategy for developing a data value for a feed-forward, open-loop output approximating the desired set-point and for using the feed-forward, open-loop output data value in conjunction with the data value for the closed-loop output to create the data value for the final output.

4. An engine as set forth in claim 3 wherein the control system comprises a map containing feed-forward set-point data values, each of which is correlated with both a particular data value for engine speed within a range of engine speeds and a particular desired engine fueling within a range of engine fueling, and the processor comprises strategy for selecting one of the feed-forward set-point data values from the map on the basis of a data value indicative of engine speed and of a data value indicative of desired engine fueling developed by the processor, and for then using the one selected feed-forward set-point data value in conjunction with the data value for the closed-loop output to create the data value for the final output.

5. An engine as set forth in claim 1 wherein the processor comprises strategy for developing a feed-forward data value approximating the desired set-point and for using the feed-forward data value approximating the desired set-point in conjunction with the data value for the closed-loop output to create the data value for the final output.

6. An engine as set forth in claim 1 wherein the processor comprises strategy for processing a data value indicative of desired engine fueling, a data value indicative of engine speed, a data value indicative of engine temperature, and a data value indicative of barometric pressure to develop the data value representing the desired set-point of operation for the valve corresponding to the desired exhaust by-pass flow around the one turbine.

7. An engine as set forth in claim 6 wherein the processor comprises strategy for evaluating the data value representing the desired set-point of operation for the valve corresponding to the desired exhaust by-pass flow around the one turbine for compliance with an allowable range defined by a data value for a minimum limit and a data value for a maximum limit.

8. An engine as set forth in claim 1 wherein the processor comprises strategy for selecting a data value of closed-loop gain from a schedule based on both a data value indicative of desired engine fueling and a data value indicative of engine speed.

9. A control system for controlling the extent to which a valve selectively by-passes exhaust flow around one of two turbines in an engine exhaust system, the control system comprising:

a processor a) for processing data values of various parameters to develop to develop a data value representing a desired set-point of operation for the valve corresponding to a desired exhaust by-pass flow around the one turbine, b) for processing the desired set-point data value and a data value correlated with the actual set-point of operation of the valve to develop a set-point error data value for closed-loop control of the actual set-point, c) for selecting a data value of closed-loop gain from a schedule based on a data value of a parameter that characterizes an aspect of engine operation, d) for processing both the selected data value of closed-loop gain and the set-point error data value to create a data value for a closed-loop output, and e) for using the data value for the closed-loop output to create a data value for a final output for forcing the actual set-point to the desired set-point.

10. A system as set forth in claim 9 wherein the processor comprises strategy for processing the set-point error data value through both a proportional function and an integral function using a respective data value of closed-loop gain from a schedule for each of the proportional and integral functions and for using respective data values resulting from processing of the set-point error data value by the respective proportional and integral functions to create the data value for the closed-loop output.

11. A system as set forth in claim 10 wherein the processor comprises strategy for developing a data value for a feed-forward, open-loop output approximating the desired set-point and for using the feed-forward, open-loop output data value in conjunction with the data value for the closed-loop output to create the data value for the final output.

12. A system as set forth in claim 11 wherein the system comprises a map containing feed-forward set-point data values, each of which is correlated with both a particular data value for engine speed within a range of engine speeds and a particular desired engine fueling within a range of engine fueling, and the processor comprises strategy for selecting one of the feed-forward set-point data values from the map on the basis of a data value indicative of engine speed and of a data value indicative of desired engine fueling developed by the processor, and for then using the one selected feed-forward set-point data value in conjunction with the data value for the closed-loop output to create the data value for the final output.

13. A system as set forth in claim 9 wherein the processor comprises strategy for developing a feed-forward data value approximating the desired set-point and for using the feed-forward data value approximating the desired set-point in conjunction with the data value for the closed-loop output to create the data value for the final output.

14. A system as set forth in claim 9 wherein the processor comprises strategy for processing a data value indicative of desired engine fueling, a data value indicative of engine speed, a data value indicative of engine temperature, and a data value indicative of barometric pressure to develop the data value representing the desired set-point of operation for the valve corresponding to the desired exhaust by-pass flow around the one turbine.

15. A system as set forth in claim 9 wherein the processor comprises strategy for evaluating the data value representing the desired set-point of operation for the valve corresponding to the desired exhaust by-pass flow around the one turbine for compliance with an allowable range defined by a data value for a minimum limit and a data value for a maximum limit.

16. A system as set forth in claim 9 wherein the processor comprises strategy for selecting a data value of closed-loop gain from a schedule based on both a data value indicative of desired engine fueling and a data value indicative of engine speed.

17. A method for controlling the extent to which a valve selectively by-passes exhaust flow around one of two turbines in an engine exhaust system, the method comprising:
a) processing data values of various parameters to develop to develop a data value representing a desired set-point of operation for the valve corresponding to a desired exhaust by-pass flow around the one turbine, b) processing the desired set-point data value and a data value correlated with the actual set-point of operation of the valve to develop a set-point error data value for closed-loop control of the actual set-point, c) selecting a data value of closed-loop gain from a schedule based on a data value of a parameter that characterizes an aspect of engine operation, d) processing both the selected data value of closed-loop gain and the set-point error data value to create a data value for a closed-loop output, and e) using the data value for the closed-loop output to create a data value for a final output for forcing the actual set-point to the desired set-point.

18. A method as set forth in claim 17 including processing the set-point error data value through both a proportional function and an integral function using a respective data value of closed-loop gain from a schedule for each of the proportional and integral functions and using respective data values resulting from processing of the set-point error data value by the respective proportional and integral functions to create the data value for the closed-loop output.

19. A method as set forth in claim 18 including developing a data value for a feed-forward, open-loop output approximating the desired set-point and using the feed-forward, open-loop output data value in conjunction with the data value for the closed-loop output to create the data value for the final output.

20. A method as set forth in claim 19 including selecting a feed-forward set-point data value from a map containing feed-forward set-point data values, each of which is correlated with both a particular data value for engine speed within a range of engine speeds and a particular desired engine fueling within a range of engine fueling, on the basis of a data value indicative of engine speed and of a data value indicative of desired engine fueling, and then using the selected feed-forward set-point data value in conjunction with the data value for the closed-loop output to create the data value for the final output.

21. A method as set forth in claim 17 including developing a feed-forward data value approximating the desired set-point and for using the feed-forward data value approximating the desired set-point in conjunction with the data value for the closed-loop output to create the data value for the final output.

22. A method as set forth in claim 17 including processing a data value indicative of desired engine fueling, a data value indicative of engine speed, a data value indicative of engine temperature, and a data value indicative of barometric pressure to develop the data value representing the desired set-point of operation for the valve corresponding to the desired exhaust by-pass flow around the one turbine.

23. A method as set forth in claim 17 including evaluating the data value representing the desired set-point of operation for the valve corresponding to the desired exhaust by-pass flow around the one turbine for compliance with an allowable range defined by a data value for a minimum limit and a data value for a maximum limit.

24. A method as set forth in claim 17 including selecting a data value of closed-loop gain from a schedule based on both a data value indicative of desired engine fueling and a data value indicative of engine speed.

* * * * *